May 7, 1957 W. STEHLIK 2,791,272
ANTI-GLARE SHADE FOR AUTOMOBILE WINDSHIELDS
Filed June 24, 1954
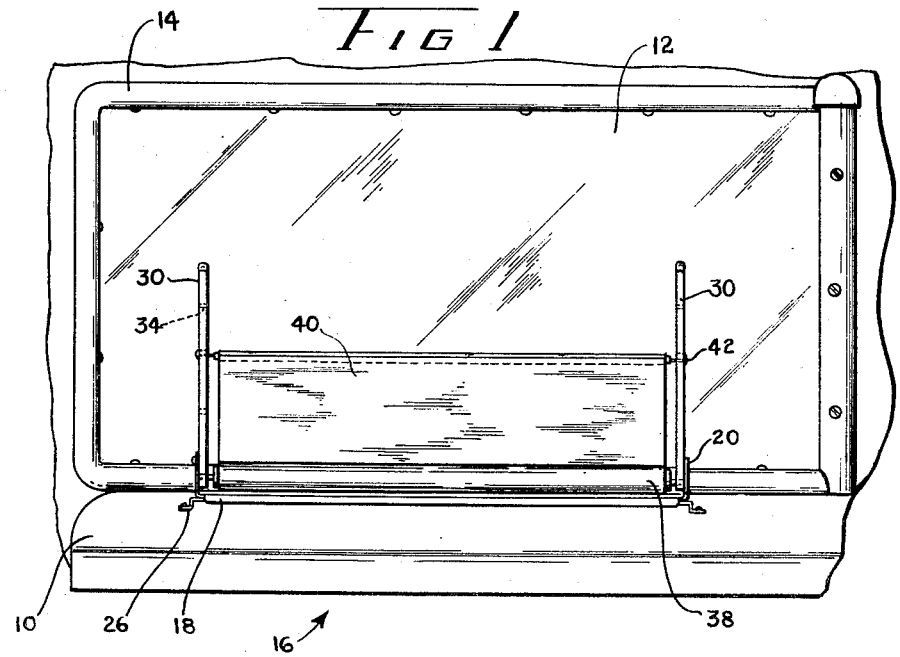
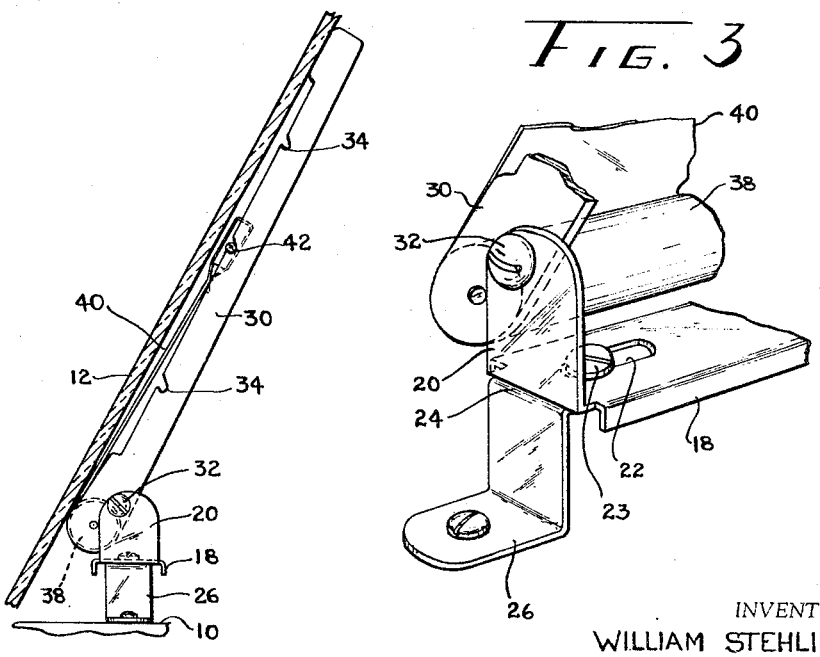
INVENTOR
WILLIAM STEHLIK
BY John L. Woodward
ATTORNEY

United States Patent Office 2,791,272
Patented May 7, 1957

2,791,272

ANTI-GLARE SHADE FOR AUTOMOBILE WINDSHIELDS

William Stehlik, Wayzata, Minn.

Application June 24, 1954, Serial No. 438,976

2 Claims. (Cl. 160—290)

My invention relates to an anti-glare shade for automobile windshields and the like.

Heretofore the anti-glare shades for automobile windshields could not be easily and readily adjusted angularly with respect to the windshield of an automobile. None of the prior anti-glare shades could be adjusted with respect to the windshield of an automobile without permitting some light glare coming in the automobile and into the eyes of the operator of the automobile.

My anti-glare shade for automobile windshields comprises an elongated mounting bar securely mounted on the instrument panel of an automobile adjacent the bottom of the windshield. An eccentrically pivoted arm is secured to each end of the mounting bar. A spring roller is journalled on the pair of pivotal arms and arranged close to the top of the mounting bar, with a flexible glare eliminating sheet wound upon the roller and the sheet is adapted to be unwound from the roller and held in adjusted positions by means of attaching on the outer end of the sheet cooperating with spaced notches in the pair of pivotal arms.

It is an object of this invention to provide in an anti-glare shade for an automobile windshield comprising means for securely mounting it on the instrument panel adjacent the bottom of the windshield.

It is another object of this invention to provide in an anti-glare shade device for automobile windshields comprising a glare eliminating sheet and means for angularly adjusting the glare eliminating sheet with respect to the windshield.

It is still another object of this invention to provide in an anti-glare shade device for an automobile windshield comprising a mounting bar arranged on the instrument panel adjacent the bottom of the windshield with a pair of eccentrically pivoted arms mounted on the bar and a roller having a glare eliminating sheet wound upon the roller to be unwound therefrom for different adjusted positions on the arms and the eccentrically pivoted arms adapted for angularly adjusting the sheet relatively close to the windshield.

With the above and numerous other objects in view as will appear as the description proceeds, the invention resides in certain novel features of construction, and in the combination and arrangement of parts as will be hereinafter more fully described and claimed.

In the drawings:

Figure 1 is a vertical transverse section through the body of an automobile looking toward the instrument board and windshield showing my anti-glare shade device mounted in place.

Figure 2 is a side elevational view of the anti-glare shade device mounted in place.

Figure 3 is a fragmentary view, on an enlarged scale, parts broken away, disclosing the eccentric mounting of an arm of the anti-glare shade device with the mounting bar thereof.

In the drawings, where for the purpose of illustration, is shown a preferred embodiment of my invention, the numeral 10 designates generally the instrument panel of an automobile which may be curved in transverse cross-section or angularly inclined adjacent to the bottom of a windshield. The automobile windshield 12 is disposed, above and at an inclination to the instrument panel 10 and includes the usual marginal sheet metal trim or molding 14 rigidly secured in place by means of spaced screws or the like.

My anti-glare shade device 16 comprises an elongated mounting bracket or bar 18 provided at its opposite ends with short upstanding vertical extensions or ears 20 formed integrally with the bar 18. The bar 18 is provided with an aperture 22 adjacent its opposite ends. There is a foot member 26 for the opposite ends of bar 18. Each foot 26 having a horizontal extension 24 provided with a slot and is secured by nut and bolt means 23 received through the slot in extensions 24 and the apertures 22 in the opposite ends of the mounting bar 18. It is obvious that the feet 26 can be adjusted with respect to the bar 18. The feet 26 are securely fastened to the dashboard 10 by screws.

An arm 30 is eccentrically pivoted to each of the ears 20 by a pivot means 32 for a purpose set forth hereinafter. Each arm 30 is provided with a plurality of spaced apart notches 34 on one edge thereof. Each notch 34 in one arm 30 is in alignment with the notches 34 in the other arm 30.

A shade roller 38 is journalled by trunnions in the arms 30 below their pivots 32 and adjacent the top of the mounting bar 18. The shade roller 38 is horizontally disposed and extends for the entire distance between the arms 30, as shown. The shade roller 38 is under constant spring tension.

A flexible colored cloth or colored plastic sheet 40 has one end secured to the roller 38 in any convenient manner, and the sheet 40 is adapted to be rolled upon the roller 38 and unrolled or extended therefrom. The sheet 40 is colored or tinted a suitable color for reducing glare due to the reflection of the sun from the hood and fenders of the driver's automobile. The outer end of the sheet 40 is provided with a horizontal pocket carrying a wood rod having a pin 42 at each end for engaging the notches 34 in the arms 30 when the sheet 40 is unwound from the roller 38.

My anti-glare shield 16 is securely mounted on the inner side of the windshield 12 on the instrument panel 10 adjacent the bottom of the windshield. The anti-glare shield 16 is to be mounted in front of the driver and adapted to cover a portion of the windshield in front of the driver in any of its vertically adjusted positions. It is possible to mount a second anti-glare shield on the dashboard 10 adjacent the right side of the windshield or on the non-driving side thereof.

When a driver of an automobile is driving toward the sun, the rays at certain angles reflect from the hood and fenders of the driver's car through the windshield into the driver's eyes.

The sheet 40 can be unwound or extended upwardly from the roller 38 for engaging an aligned notch 34 in each of the arms 30. The driver unrolls the sheet 40 until he can see over the top of the sheet 40, then the pins 42 are engaged in the aligned notches 34 in the arms 30 at approximately that elevation.

The anti-glare device 16 is mounted on the instrument panel 10 so that the sheet 40 unwinds close to the windshield 12. The eccentric pivots 32 for arms 30 project the sheet relatively close to the inside of the windshield when the arms 30 are adjusted angularly with respect to the windshield 12. The windshields of different automobiles are mounted at varying inclinations with respect to the instrument panel 10 of the automobile. So my anti-glare device 16 can be quickly adjusted angularly with respect to the windshield.

My anti-glare device 16 is secured to the instrument panel 10 adjacent the bottom of the windshield 12 with the roller 38 carrying the glare eliminating sheet 40 mounted adjacent the bottom of the windshield 12 and relatively close thereto so that no reflected rays can penetrate beneath the anti-glare device 16.

The anti-glare device 16 may be reversely mounted from the position shown in Figures 1, 2 and 3 of the drawing. That is, the eccentrics 32 of arms 30—30 would then be adjacent the driver of the automobile instead of adjacent the windshield 12 as shown in the drawing. When the eccentrics 32 of arms 30 are adjacent the driver of the vehicle, the angular adjustment of arms 30—30 moves the roller 38 and its anti-glare sheet 40 relatively close to the top of mounting bar 18 thus preventing glare penetrating between the bottom of roller 38 and the top of the bar 18.

The pivotal arms 30 are made of a transparent plastic so that they will not reflect light rays. The mounting bar 18 and the feet 26 are painted a color that will absorb light rays.

When the glare eliminating sheet 40 is not needed, the pins 42 are disengaged from the notches 34 in which engaged and the sheet 40 is rolled up on the roller 38.

The present embodiment of the invention has been described in detail for the purposes of exemplification.

It will be apparent that changes in the combination and arrangement of parts may be resorted to without departing from the spirit or scope of the invention as hereinafter claimed.

Having thus described my invention, what I claim as new is:

1. An anti-glare shade for an automobile windshield, an instrument panel adjacent the bottom of the windshield, said anti-glare shade comprising a substantially horizontally elongated mounting bar arranged on the instrument panel adjacent to the bottom of the windshield, attaching means on the mounting bar for securing it relatively close to the top of the instrument panel, an upstanding arm pivotally mounted to each end of the mounting bar, each of the pivotal arms provided with a plurality of spaced apart notches formed on one edge thereof, a spring roller journalled on the pivotal arms and arranged close to the top of the mounting bar and adjacent to the bottom of the windshield, a flexible glare eliminating sheet wound upon the roller and adapted to be unwound therefrom, attaching means carried by the outer end of the sheet for engaging the notches in the pivotal arms for holding the sheet in different elevated positions, the pivotal arms angularly adjusting the sheet with respect to the windshield, the roller being under constant spring tension whereby the roller will automatically wind the sheet of anti-glare material onto the roller.

2. An anti-glare shade for an automobile windshield, an instrument panel adjacent the bottom of the windshield, said anti-glare shade comprising an elongated mounting bar arranged on the instrument panel adjacent to the bottom of the windshield, securing means on the mounting bar for securing it relatively close to the top of the instrument panel, an upstanding arm eccentrically pivoted to the opposite ends of the mounting bar, each of the arms provided with a plurality of spaced apart notches formed on one edge thereof, a spring roller journalled on the pivotal arms and arranged close to the top of the mounting bar and adjacent to the bottom of the windshield, a flexible glare eliminating sheet wound upon the roller and adapted to be unwound therefrom, attaching means carried by the outer end of the sheet for engaging the notches in the pivotal arms for holding the sheet in different elevated positions, the pivotal arms angularly adjusting the sheet with respect to the windshield and the eccentric arms moving the roller relatively close to the top of the mounting bar.

References Cited in the file of this patent
UNITED STATES PATENTS

| | | |
|---|---|---|
| 1,566,646 | Brewster et al. | Dec. 22, 1925 |
| 1,578,932 | Smith | Mar. 30, 1926 |
| 2,594,386 | Blessen | Apr. 29, 1952 |